United States Patent
Kim et al.

(10) Patent No.: US 7,313,910 B2
(45) Date of Patent: Jan. 1, 2008

(54) JET VANE THRUST VECTOR CONTROL SYSTEM

(75) Inventors: Won-Hoon Kim, Daejeon (KR);
Joo-Chan Bae, Daejeon (KR);
Seong-Taek Lim, Daejeon (KR);
Sung-Han Park, Daejeon (KR)

(73) Assignee: Agency for Defense Development, Daejeon (KR)

( * ) Notice: Subject to any disclaimer, the term of this patent is extended or adjusted under 35 U.S.C. 154(b) by 538 days.

(21) Appl. No.: 11/026,230

(22) Filed: Dec. 30, 2004

(65) Prior Publication Data
US 2005/0178878 A1   Aug. 18, 2005

(30) Foreign Application Priority Data
Jan. 31, 2004   (KR) .................... 10-2004-0006443

(51) Int. Cl.
*F02K 1/00* (2006.01)
*F02K 1/54* (2006.01)

(52) U.S. Cl. .......................... 60/228; 60/253
(58) Field of Classification Search ............. 60/200.1, 60/253, 228
See application file for complete search history.

(56) References Cited

U.S. PATENT DOCUMENTS

| | | | | |
|---|---|---|---|---|
| 3,011,309 A | * | 12/1961 | Carter ................... | 239/265.15 |
| 3,140,584 A | * | 7/1964 | Ritchey et al. ............... | 60/232 |
| 3,940,067 A | * | 2/1976 | Cherry et al. .......... | 239/265.11 |
| 4,852,347 A | * | 8/1989 | Reynolds et al. ............. | 60/253 |
| 5,675,966 A | * | 10/1997 | Dombrowski et al. ........ | 60/204 |
| 6,315,239 B1 | * | 11/2001 | Voigt ......................... | 244/3.22 |
| 6,554,936 B1 | * | 4/2003 | Metcalf et al. ............. | 156/172 |
| 6,948,307 B2 | * | 9/2005 | Berdoyes et al. ............. | 60/232 |

* cited by examiner

*Primary Examiner*—William H. Rodriguez
(74) *Attorney, Agent, or Firm*—Scully, Scott, Murphy & Presser, P.C.

(57) ABSTRACT

Disclosed is a jet vane thrust vector control (JV-TVC) system. A general system has many problems in design techniques considering actual operation environments, and does not have reliability in component assembly design. The JV-TVC system improves thrust vector control and high angle of attack maneuvering performance of a missile by allowing rotational angles of jet vanes to maximum ±30°, precisely controls the thrust vector of the missile by preventing damages of components for the designated flight time of the missile, and improves precision and reliability in the assembly process by modularization.

10 Claims, 15 Drawing Sheets

JET VANE THRUST VECTOR CONTROL SYSTEM

BACKGROUND OF THE INVENTION

1. Field of the Invention

The present invention relates to a jet vane thrust vector control (JV-TVC) system, and more particularly to, a JV-TVC system which can obtain high angle of attack maneuvers and perform stabilized attitude control in rapid pitchover toward a target direction after launching a missile.

2. Description of the Background Art

In general, aerodynamic wings are installed on a missile to control the direction of the missile. Since a speed is low in launching the missile, it is not easy to control the direction of the missile by the aerodynamic wings.

There are thus demands for different means for controlling the direction of the missile in launching the missile. For this, a thrust vector control (TVC) system has been developed.

The missile using the JV-TVC system can not only control the direction but also be vertically launched in respect of operation. Accordingly, it is possible to omnidirectionally monitor the missile, provide a rapid pitch-over the missile after launching, and enter the missile into an optimum orbit within a short time according to the purpose of the missile.

The application methods of the TVC system can be achieved, in general, with liquid injection, a movable nozzle and a mechanical deflector method.

Among the methods, a mechanical TVC method achieving miniaturization such as jet vane, jetavator and jet tab has been widely used for the TVC system of the tactical missile.

A JV-TVC method that can provide 3-axis control of pitch, yaw and roll in one nozzle in missile flight has been widely used for the general TVC system.

Exemplary missiles using the JV-TVC system include VLASROC (USA), SEA SPARROW (USA), BARAK (Israel), MICA (France) and S-300 (Russia) et al.

The JV-TVC system controls a thrust vector by adjusting flame gas flow, by installing generally four jet vanes on an inside surface or at an end of a nozzle exit unit of a propulsion system and changing the angles of the jet vanes in combustion of the propulsion system.

In the conventional art, three jet vanes are individually installed on a nozzle, and the inner wall of the nozzle is formed in a conical shape. It is thus difficult to precisely assemble the system and control the thrust vector.

In addition to that the inner wall of the nozzle is formed in a conical shape, the root periphery of the jet vane adjacent to the inner wall of the nozzle does not make a right angle with a jet vane shaft. Therefore, the rotational angle of the jet vane inside the nozzle is restricted. A relatively large gap must be formed between the root periphery of the jet vane adjacent to the inner wall of the nozzle and the inner wall of the nozzle. Moreover, the gap must be precisely designed and formed according to the inside diameter of the inner wall of the nozzle and the size of the jet vane. It makes it more difficult to manufacture and assemble the system.

The JV-TVC system must satisfy performance requirements of a rocket or a missile. In the patent of Faupell et al., since the relatively large gap is formed between the root periphery of the jet vane and the inner wall of the nozzle and the jet vane shaft is simply supported through an axial hole formed in a straight line on an exit cone liner and an exit cone body composing the nozzle, heat of flames ejected from the nozzle is easily transmitted to a bearing for supporting the jet vane shaft to the exit cone body and an O-ring for maintaining airtightness through the clearance and a clearance between the jet vane shaft and the axial hole. Therefore, the bearing and the O-ring are damaged for a designated flight time, so that the thrust vector of the rocket or the missile cannot be precisely controlled.

As a result, the JV-TVC system is disadvantageous in the thermal respect because the jet vanes are directly exposed to the high temperature combustion gas. Ablation and thrust loss (3~5%) are caused for a combustion time. Especially, design techniques such as mutual assembly between the jet vanes and the peripheral devices and hermetical sealing are required for precise and reliable control.

The most important factors of the JV-TVC system researches include development of anti-erosion materials, design of jet vanes having thermal and fluid dynamics properties to flame gas, and design of related component mechanism. A method for preventing thermal locking or sticking between a jet vane shaft and a housing by heat transfer in combustion and a method for hermetically sealing a fastening assembly part by flame gas are also essential.

The existing design mechanism of the JV-TVC system has many problems in design techniques considering actual operation environments. Especially, the existing design mechanism does not have reliability in component assembly design.

SUMMARY OF THE INVENTION

Therefore, an object of the present invention is to provide a jet vane thrust vector control (JV-TVC) system which can satisfy rotational angles of jet vanes and improve thrust vector control and high maneuvering performance of a missile.

Another object of the present invention is to provide a JV-TVC system which can precisely control a thrust vector of a missile by preventing damages of components for the designated flight time of the missile.

Yet another object of the present invention is to provide a JV-TVC system which can be precisely assembled in an assembly process by modularization.

As a result, the JV-TVC system can play a great role in controlling the direction of the missile and improving the high maneuvering performance.

To achieve these and other advantages and in accordance with the purpose of the present invention, as embodied and broadly described herein, there is provided a jet vane thrust vector control (JV-TVC) system, including: a rocket motor having a motor case with solid propellant, and a nozzle assembly unit protruded from the rear end of the motor case in a ring shape; a nozzle assembly including a nozzle body having a flange unit assembled to the case flange unit and a cylindrical unit extended from the flange unit in the backward direction, and a nozzle liner assembled to the inner circumferences of the cylindrical unit and the flange unit and extended longer than the cylindrical unit in the backward direction; a skin including a skin body having its front end inner circumference closely adhered to the outer circumference of the case flange unit, and being fixed by fastening a screw passing through a main wall to the case flange unit, and a mounting strip formed on the inner circumference of the skin body as a ring-shaped plate; an actuator assembly having an actuator body fixed to the front surface of the mounting strip of the skin, and a piston rod protruded from the actuator body in the backward direction and linearly reciprocated in the forward/backward direction; a shroud assembly having a cylindrical shroud body disposed at the rear end of the cylindrical unit of the nozzle body, a shroud liner assembled to the inner circumference of the shroud body, and a plurality of bosses protruded from the outer circumference of the shroud body; a jet vane assembly having a jet vane shaft rotationally supported by the bosses, and a jet vane assembled to the inside end of the jet vane shaft; a jet vane support unit having a bearing housing inserted into the boss unit, a bearing inserted into the bearing housing, for supporting the jet vane shaft, and a jet vane shaft support plate for supporting the outside end of the jet vane shaft; and an crank assembly engaged with the piston rod of the actuator, for rotating the jet vane shaft and the jet vane in the right/left direction.

The inner circumference of the front end of the shroud body is closely adhered to the outer circumference of the cylindrical unit of the nozzle assembly, and the front section of the front end of the shroud liner is closely adhered to the cylindrical unit and the inner circumference thereof is closely adhered to the outer circumference of the rear end of the nozzle liner.

A hooking jaw on which the outer circumference of the front end of the shroud liner is hooked is formed at the front end of the shroud body.

The bosses of the shroud body and the jet vane shaft support plate are fixed to the mounting strip of the skin by fixing screws passing through the actuator body and the mounting strip.

The jet vane is formed in a rectangular shape having inner and outer circumferences parallel to the center axis of the skin body and having a streamlined section, and a plane unit being parallel to the center axis of the skin body to correspond to the outer circumference of the jet vane and contacting the circumference on the basis of the center axis is formed in the position of the inner circumference of the shroud liner corresponding to the bosses.

The jet vane shaft includes a support unit supported by the bosses, a jet vane assembly unit incorporated with the inside end of the support unit, the jet vane being assembled to the jet vane assembly unit, and an engaged unit incorporated with the outside end of the support unit and engaged with the crank assembly.

A vane shaft fastening groove is formed on the root periphery of the jet vane, the jet vane assembly unit is extended from the end of the inner circumference of the support unit to both sides to make a right angle with the axial line of the jet vane shaft, and a vane shaft through hole is extended from the center of the inside surface thereof on the same axis as the jet vane shaft, and fastened to the vane shaft fastening groove of the jet vane.

A heat shield plate is inserted between the jet vane assembly unit and the jet vane.

An assembly groove into which the root periphery of the jet vane is inserted is formed on the assembly part of the inside surface of the heat shield plate with the jet vane to have the same streamlined section as the section of the jet vane.

The crank assembly includes a crank arm having its one end fixed to the engaged unit of the jet vane shaft, and a connection pin for relatively rotatably connecting the other end of the crank arm to the front end of the piston rod of the actuator.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
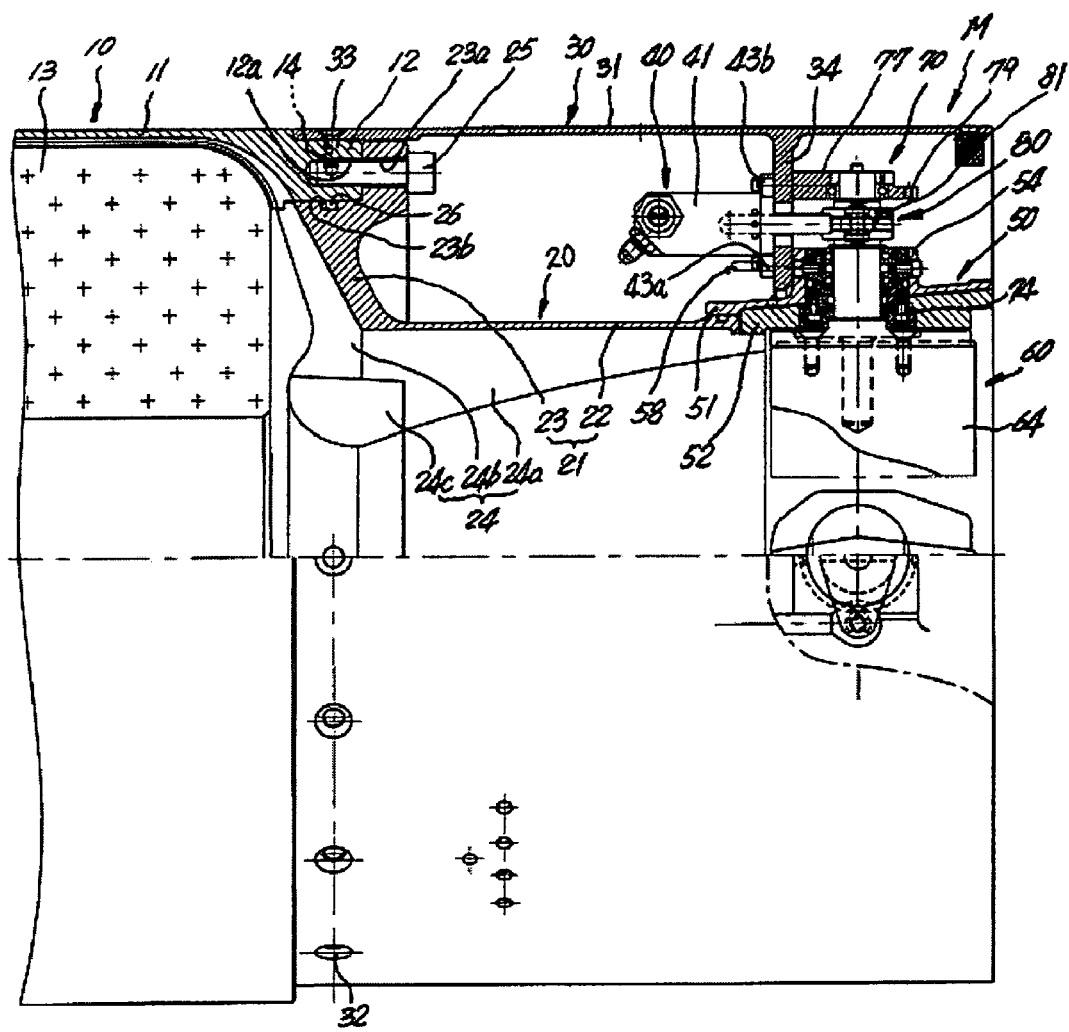
FIGS. 1 and 2 are a partial vertical side view and a rear view illustrating a assembly state of a JV-TVC system module and a solid fuel propulsion system in accordance with the present invention.
Figure 2:
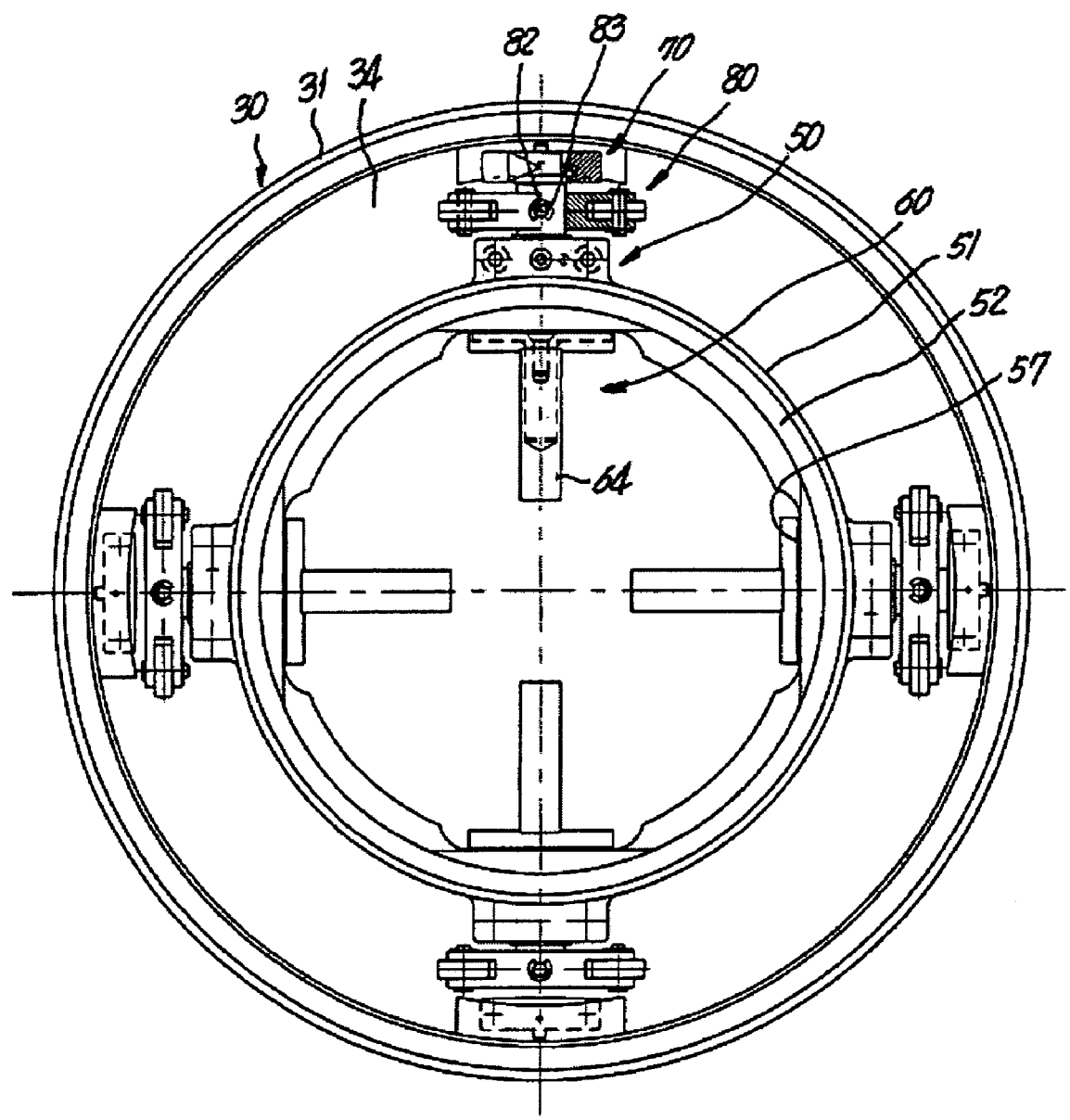

FIGS. 1 and 2 are a partial vertical side view and a rear view illustrating a assembly state of a JV-TVC system module and a solid fuel propulsion system in accordance with the present invention.

Hereinafter, a front end portion of a missile is referred to as a forward or front end, a rear end portion of the missile is referred to as a backward or rear end, a center portion from a center axial line of the missile is referred to as an inside, an inside end or an inside surface, and an outer circumferential portion from the center axial line of the missile is referred to as an outside, an outside end or an outside surface.

In FIGS. 1 and 2, reference numerals 10 and 20 denote a rocket motor filled with a solid fuel propellant 13, and a nozzle assembly assembled to the rocket motor 10, respectively.

The rocket motor 10 includes a motor case 11 formed in a cylindrical shape, and a case flange unit 12 protruded from the rear end of the motor case 11 in a ring shape.

The nozzle assembly 20 includes a nozzle body 21, and a nozzle liner 24 for protecting the nozzle body 21 from combustion gas.

In the nozzle body 21, a cylindrical unit 22 and a flange unit 23 formed at the front end of the cylindrical unit 22 to correspond to the case flange unit 12 are incorporated. The nozzle liner 24 includes an exit liner 24a closely adhered to the inner circumference of the cylindrical unit 22, a convergent liner 24b assembled to the front end of the exit liner 24a for surrounding the flange unit 23, and a nozzle throat 24c of the exit liner 24a.

The nozzle body 21 of the nozzle assembly 20 is made of a metal material, and the nozzle liner 24 is made of a heat-resistant ablative material.

The rocket motor 10 and the nozzle assembly 20 are assembled to each other, by fastening a high strength bolt 25 passing through a bolt through hole 23a formed on the flange unit 23 into a bolt fastening groove 12a formed at the rear end of the case flange unit 12.

An O-ring 26 for maintaining airtightness is inserted between the inner circumference of the case flange unit 12 of rocket motor 10 and the outer circumference of the flange unit 23 of the nozzle assembly 20. An O-ring groove 23b into which the O-ring 26 is inserted is formed on the flange unit 23.

In FIGS. 1 and 2, M denotes the JV-TVC system module in accordance with the present invention.

The JV-TVC system module M includes a skin 30 assembled to the outer circumference of the case flange unit 12 of the rocket motor 10, an actuator assembly 40 built in between the outer circumference of the cylindrical unit 22 of the nozzle body 21 of the nozzle assembly 20 and the inner circumference of the skin 30, a shroud assembly 50 assembled to the inside of the rear end of the skin 30, and disposed on the same axis as the nozzle assembly 20, a plurality of jet vane assemblies 60 rotatably installed inside the shroud assembly 50, a jet vane support unit 70 for rotatably supporting the jet vane assemblies 60 on the shroud assembly 50, and a crank assembly 80 for transmitting a driving force of the actuator assembly 40 to the jet vane assemblies 60.

Figure 6A:
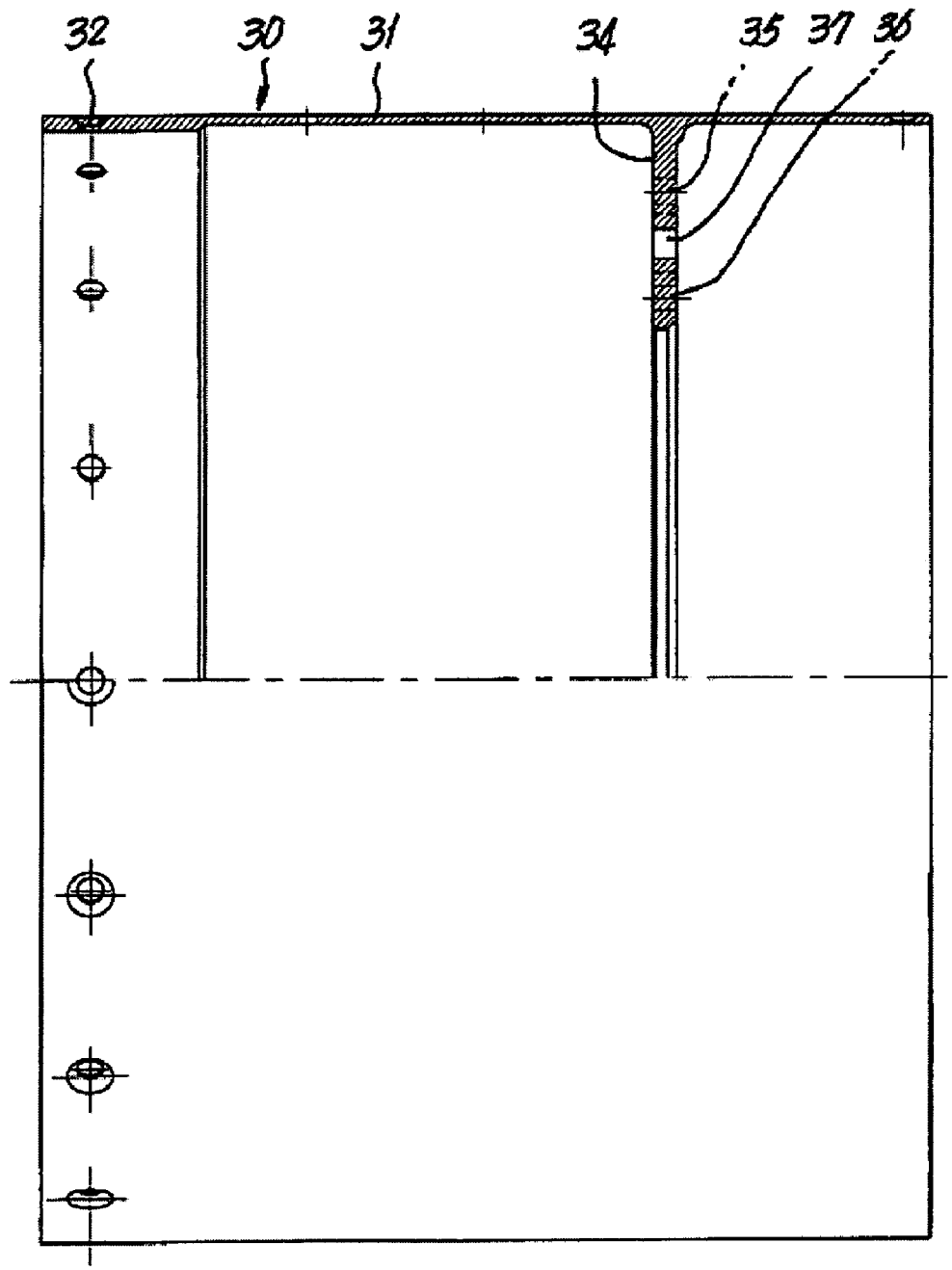
FIGS. 6a and 6b are a vertical side view and a rear view illustrating a skin.
Figure 6B:
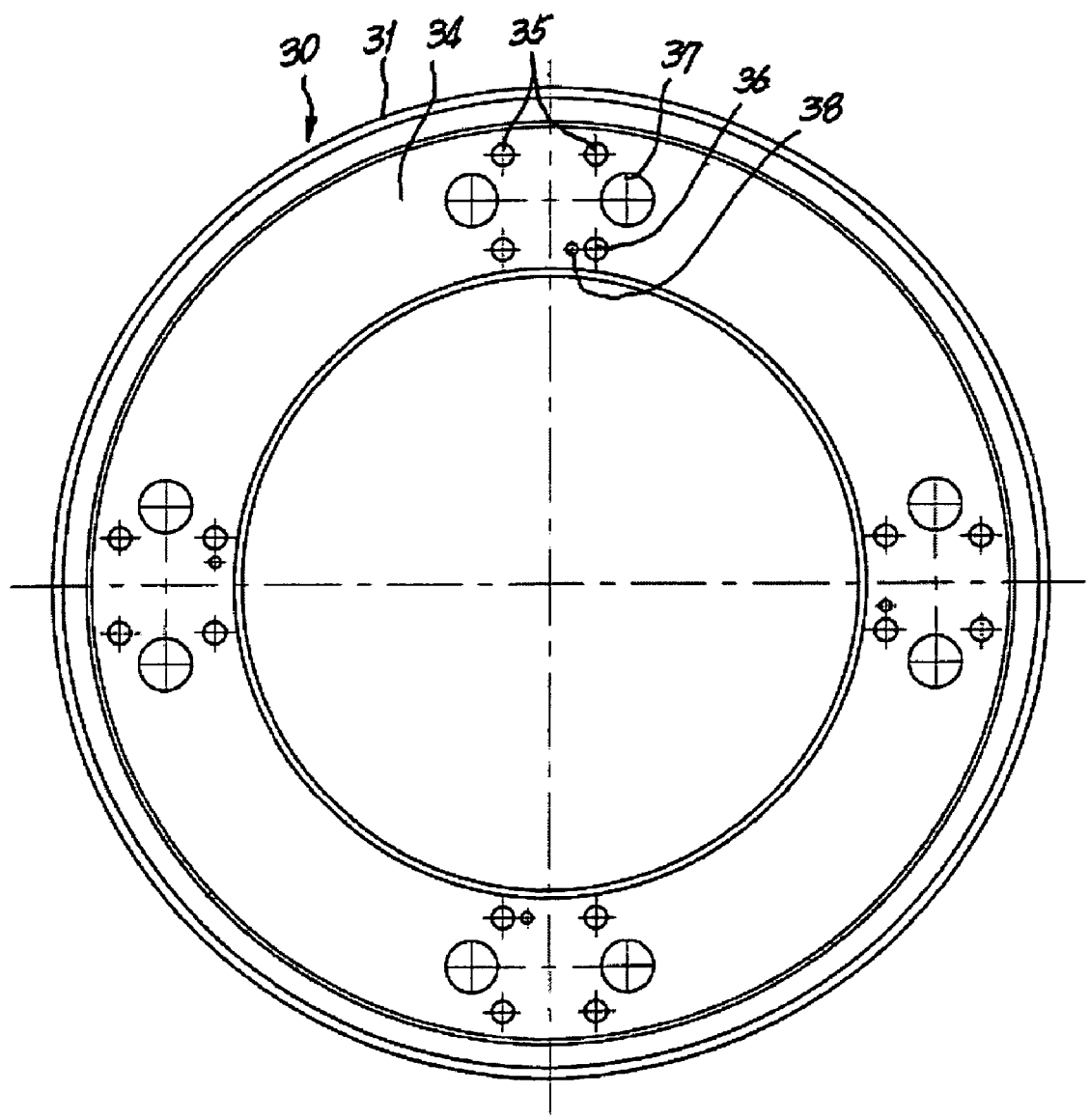

As shown in FIGS. 6a and 6b, the skin 30 includes a skin body 31, and a mounting strip 34 formed on the inner circumference of the skin body 31 as a ring-shaped plate.

Figure 3:
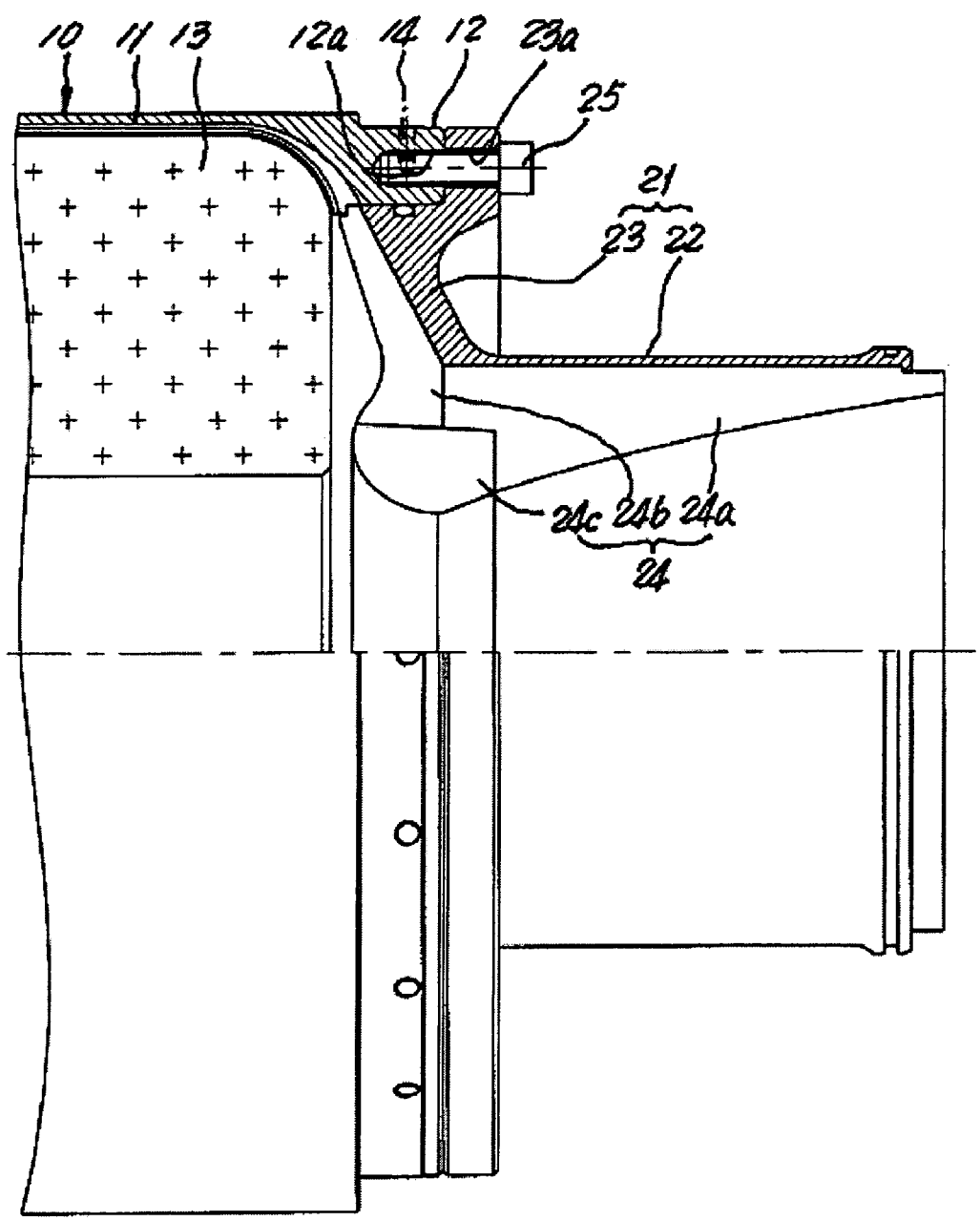
FIGS. 3 and 4 are a vertical side view and a rear view illustrating a assembly state of a rocket motor and a nozzle assembly.
Figure 4:
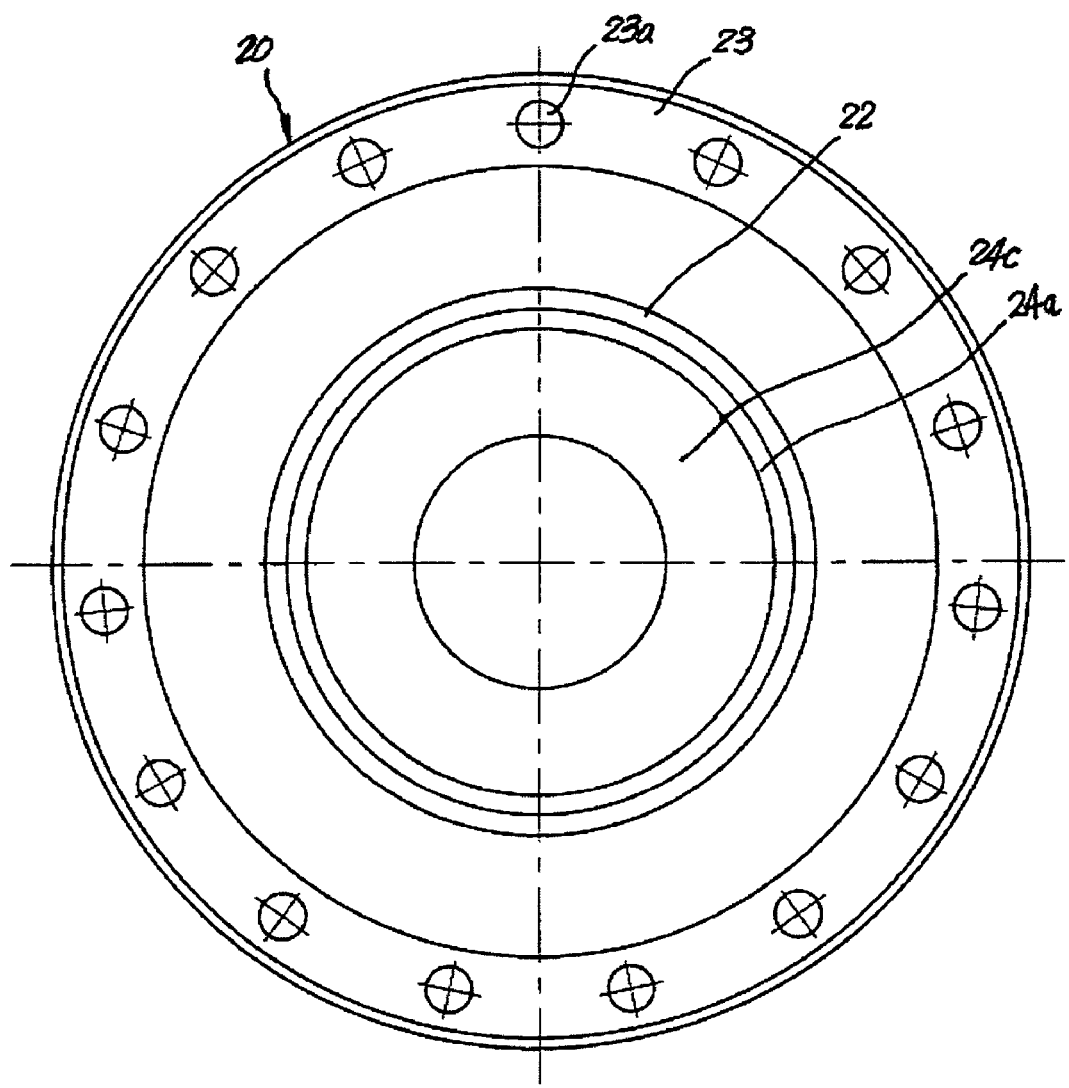
Figure 5:
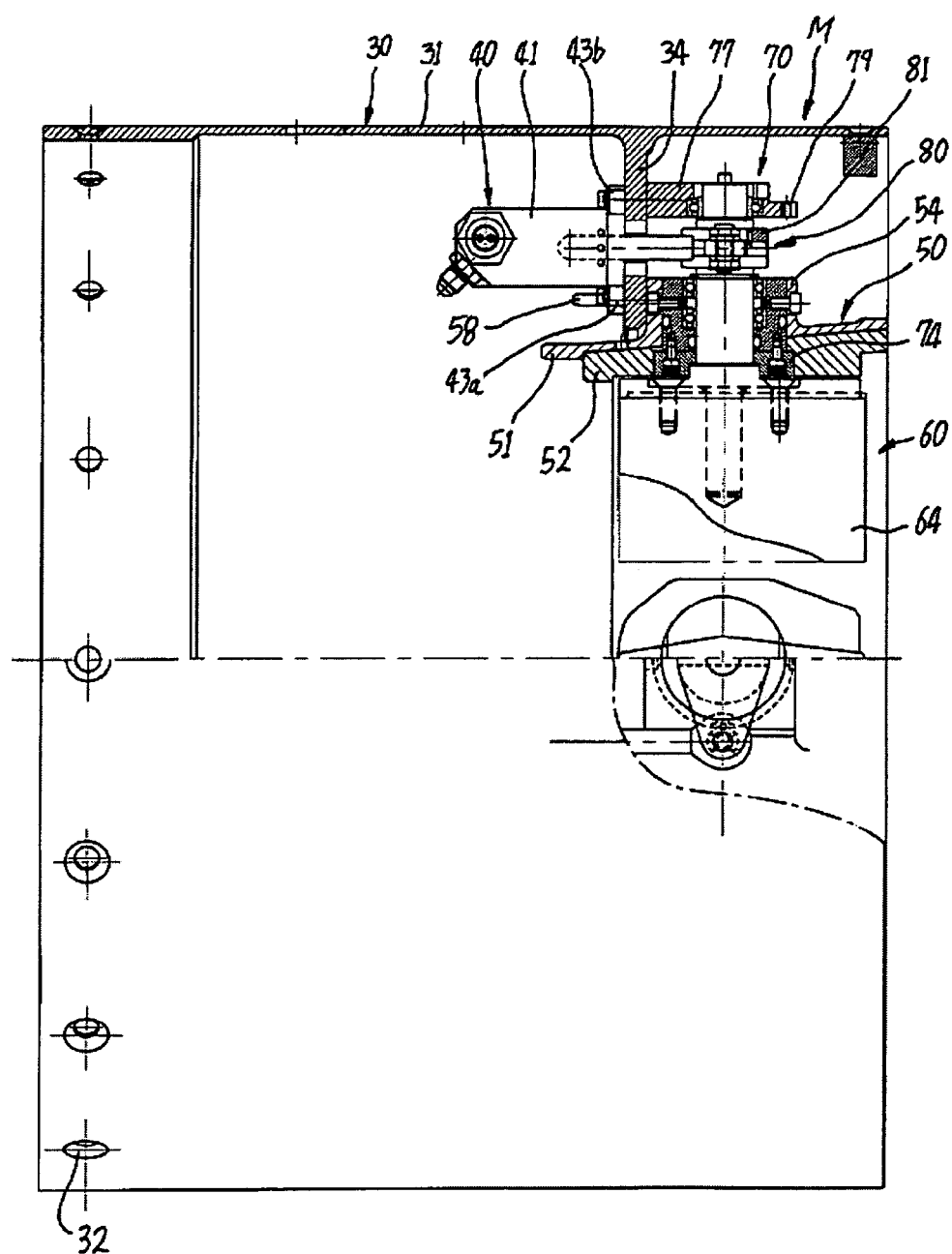
FIG. 5 is a vertical side view illustrating the JV-TVC system module in accordance with the present invention.

As illustrated in FIGS. 1, 3 and 6a, the rocket motor 10 and the skin 30 are assembled to each other, by fastening a plurality of screws 33 passing through a plurality of screw through holes 32 formed on the main wall of the front end of the skin body 31 to a plurality of screw fastening grooves 14 formed on the outer circumference of the case flange unit 12. The plurality of screw through holes 32 and the plurality of screw fastening grooves 14 are formed at regular intervals. The number of the screws 33 is dependent upon applied load.

Screw through holes 35 for fixing an actuator body 41, screw through holes 36 for fixing the jet vane support unit 70 discussed later, and piston rod insertion holes 37 into which a piston rod 42 is inserted are formed respectively in four positions of the mounting strip 34 at an interval of 90°. There are also formed guide pin holes 38 for precisely determining the assembling position of the shroud assembly 50 and the jet vane assemblies 60 in regard to the skin 30.

The actuator assembly 40 is a general linear actuator having the actuator body 41, and the piston rod 42 protruded from the actuator body 40 in the backward direction for performing forward/backward motion.

The actuator body 41 is fixed to the front surface of the mounting strip 34 by fastening fixing screws 43a and 43b, and the piston rod 42 is installed to be linearly reciprocated through the piston rod insertion holes 37 formed on the mounting strip 34.

One piston rod 42 can be used, but preferably, a pair of piston rods 42 are installed to be linearly reciprocated in the opposite directions for stability of the operation.

A ring-shaped connection unit 42a connected to a crank arm 81 of the crank assembly 80 is formed at the front end of the piston rod 42.

The fixing screw 43a is fastened to a screw fastening hole 55 formed on a boss 54 of the shroud assembly 50 discussed later through the actuator body 41 and the screw through hole 35, thereby fixedly assembling the actuator assembly 40 and the shroud 50 to the front and rear sides of the mounting strip 34.

Figure 7:
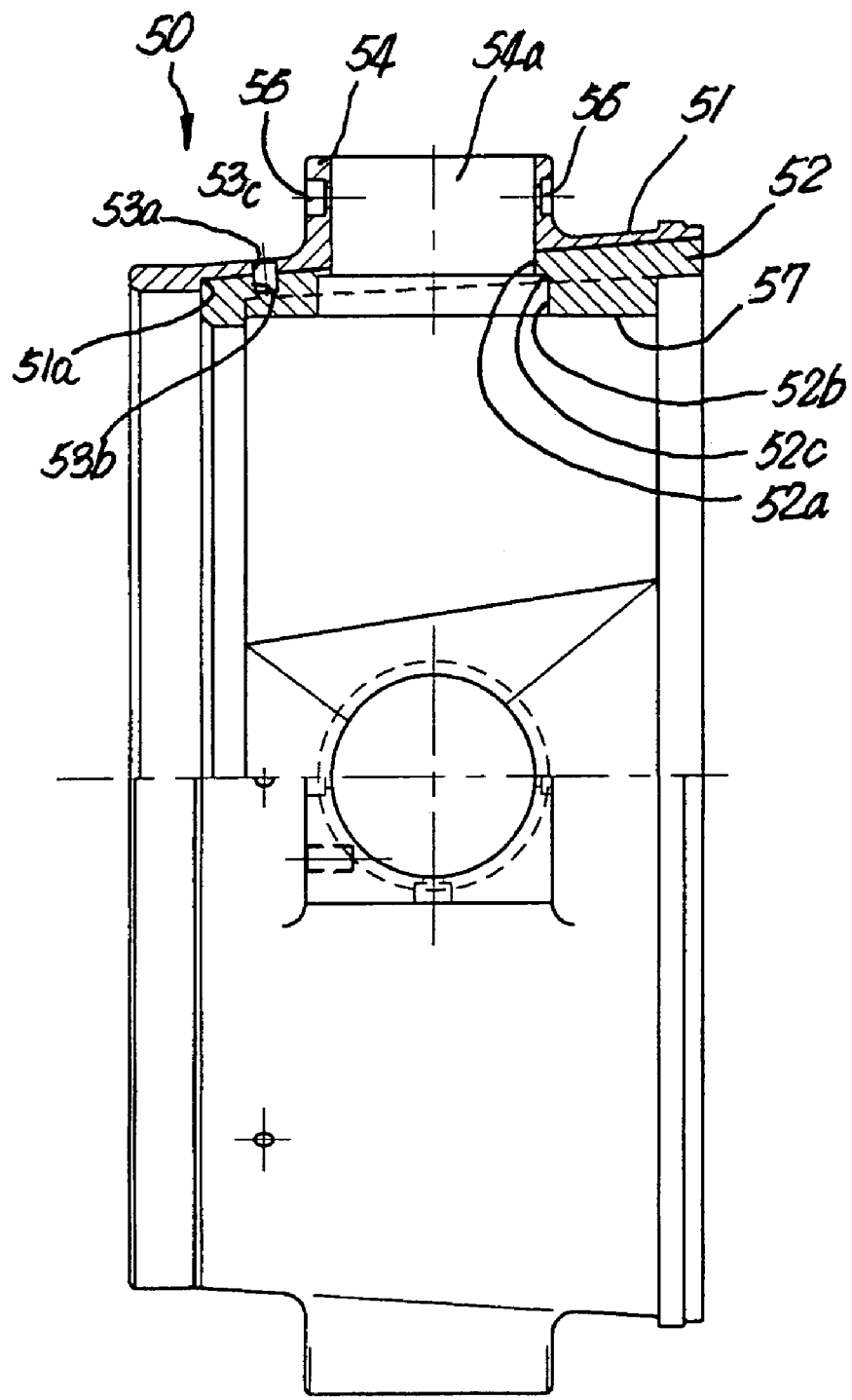
FIGS. 7 and 8 are a vertical side view and a rear view illustrating a shroud assembly.
Figure 8:
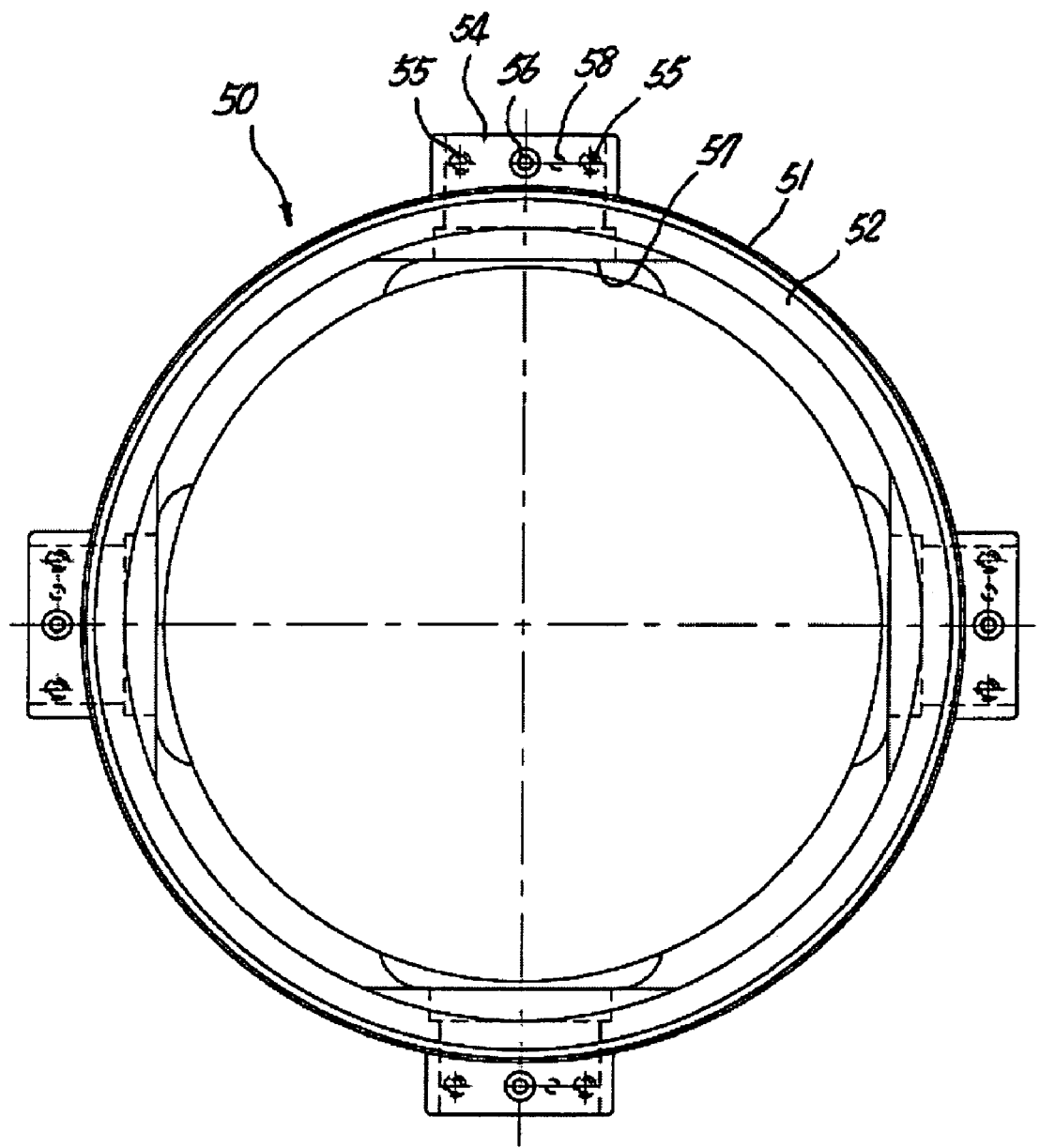
Figure 9:
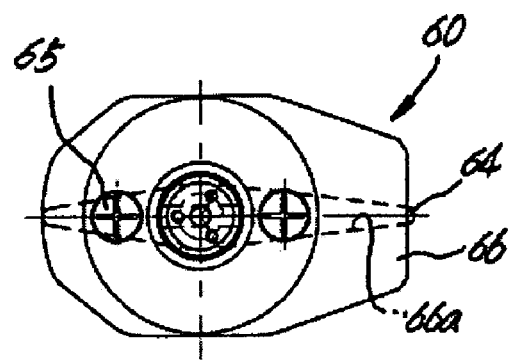
FIGS. 9 to 11 are a plane view, a vertical side view and a vertical front view illustrating a unit jet vane assembly.
Figure 10:
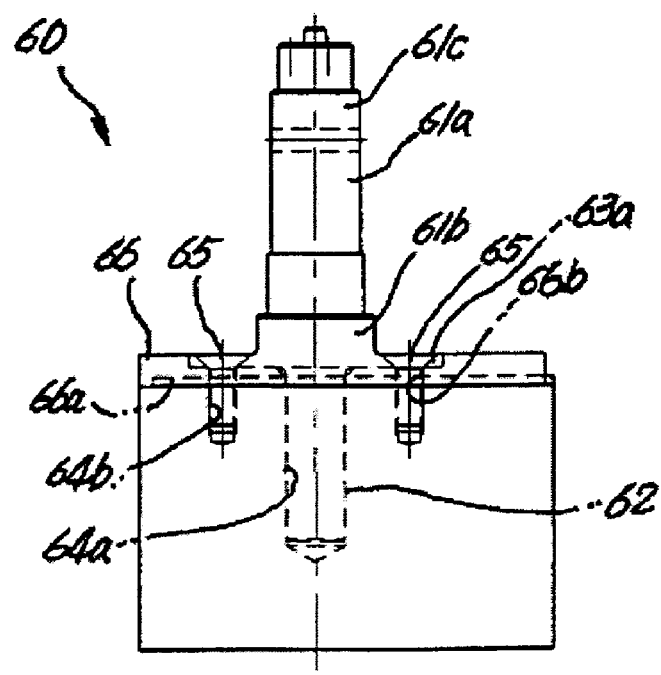
Figure 11:
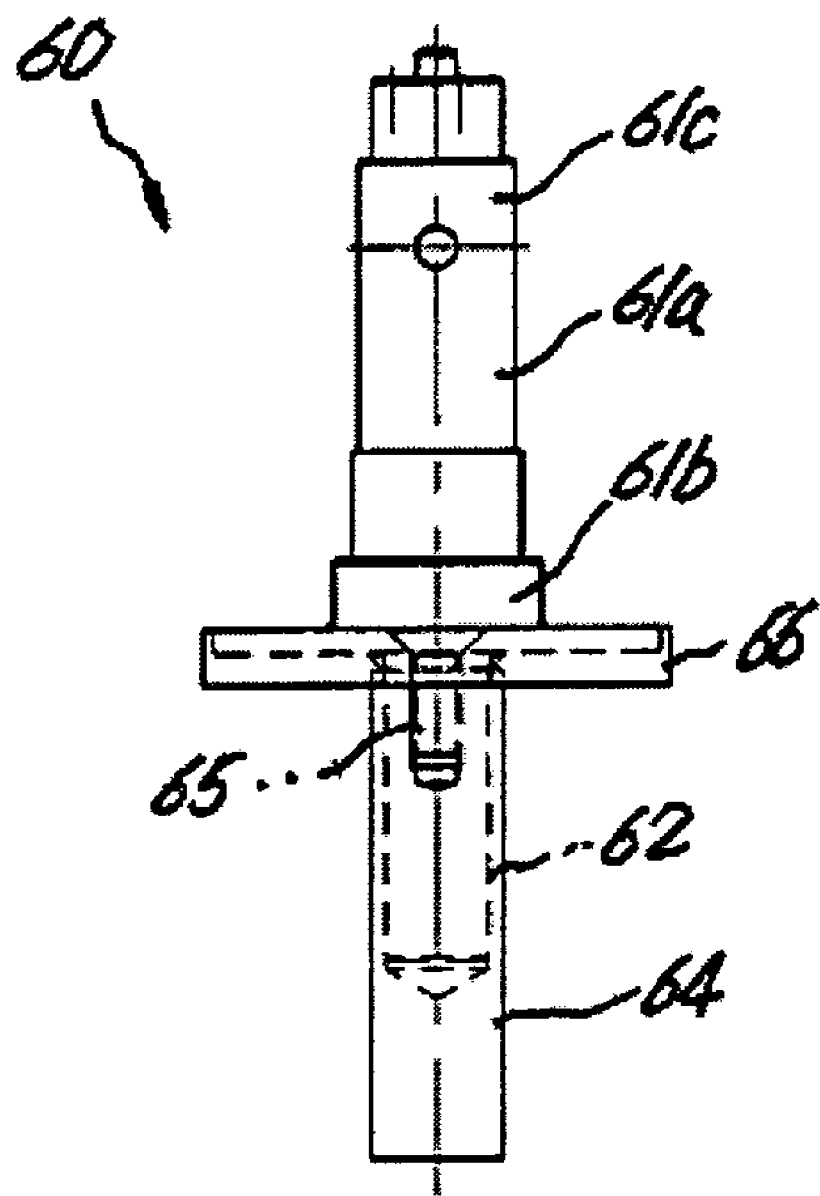
Figure 12:
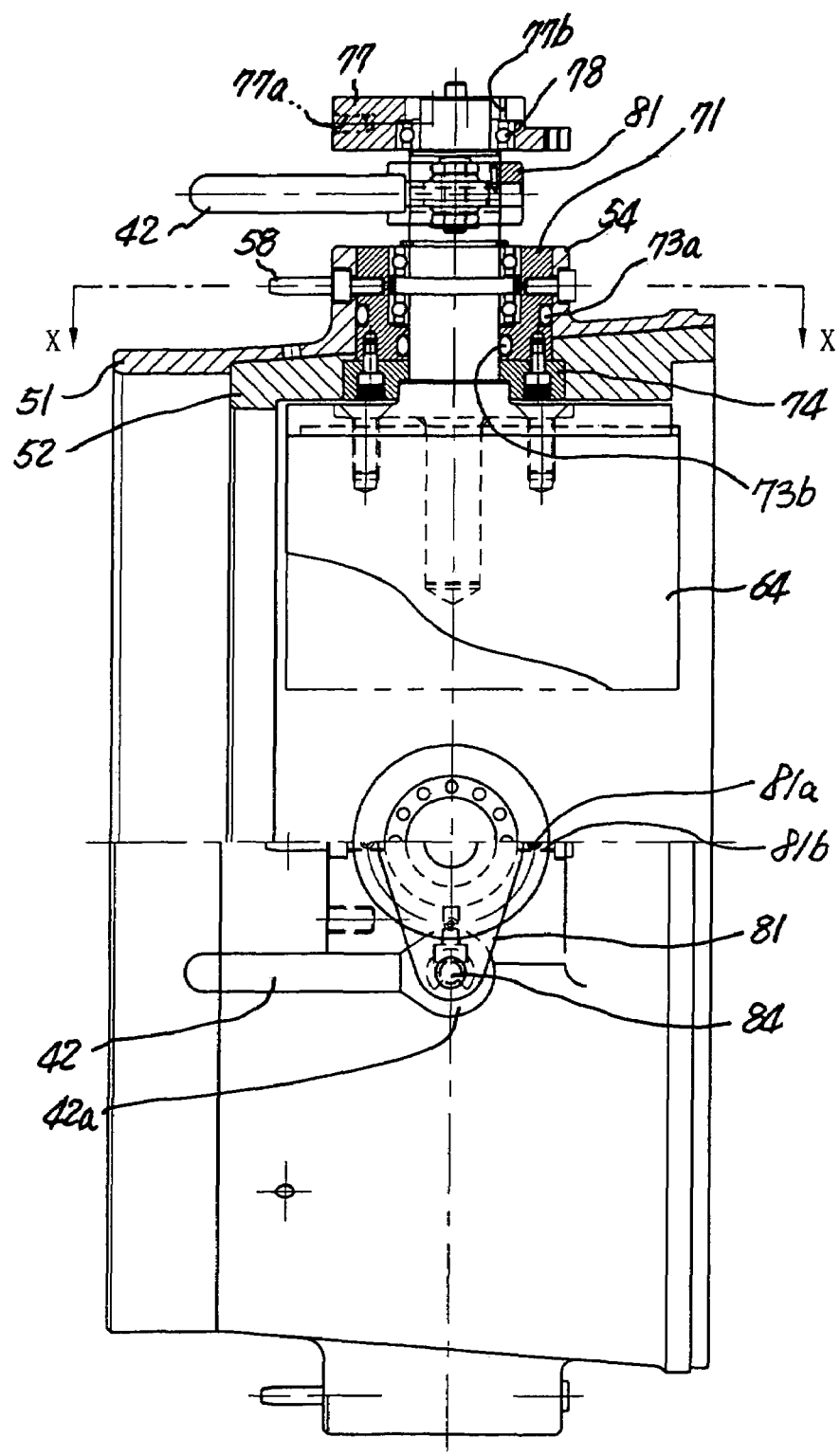
FIG. 12 is a vertical side view illustrating a assembly state of the shroud assembly, the jet vane assembly, a jet vane support unit and an actuator piston rod.
Figure 13:
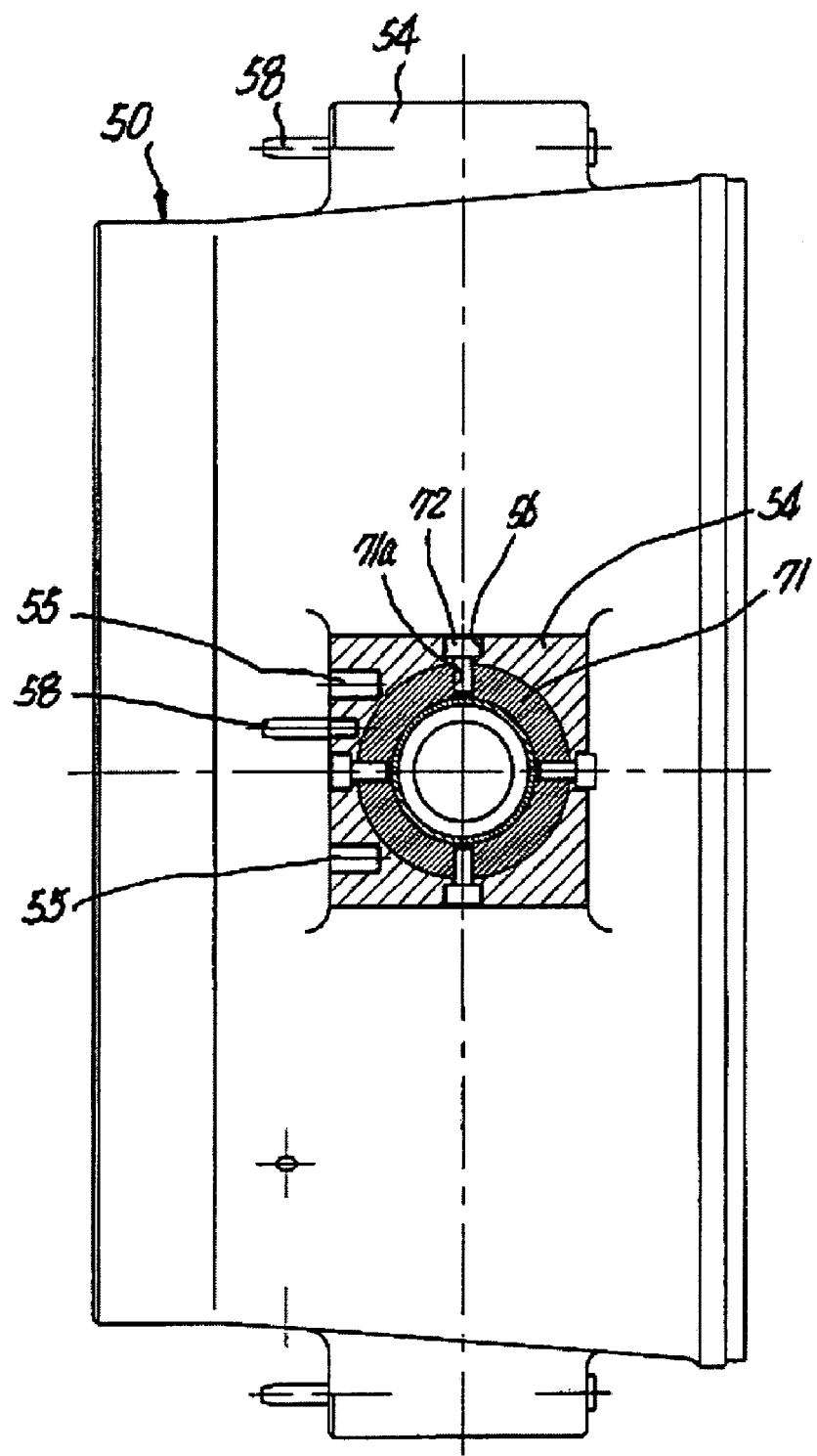
FIG. 13 is a cross-sectional view taken along line X-X of FIG. 12.

As depicted in FIGS. 1 and 7, the shroud assembly 50 includes a conical shroud body 51 being disposed at the rear end of the cylindrical unit 22 of the nozzle assembly 20, and having its diameter increased in the backward direction, and a shroud liner 52 assembled to the inner circumference of the shroud body 51, and disposed at the rear end of the nozzle liner 24.

The inner circumference of the front end of the shroud body 51 surrounds the rear end of the nozzle body 21, and the inner circumference of the front end of the shroud liner 52 surrounds the outer circumference of the rear end of the nozzle liner 24.

The shroud body 51 is made of a metal material, and the shroud liner 52 is made of a heat-resistant ablative material. Preferably, a silica phenolic heat shield material is used for the shroud liner 52 for insulation.

The inner circumference of the front end of the shroud body 51 is installed to overlap with the outer circumference of the rear end of the cylindrical unit 22 of the nozzle body 21.

A hooking jaw 51a on which the outer circumference of the front end of the shroud liner 52 is hooked is formed at the front end of the inner circumference of the shroud body 51 in order to precisely maintain the assembling position of the shroud body 51 and the shroud liner 52.

A plurality of support pin through holes 53a (eight) are formed on the main wall of the shroud body 51, and a plurality of support pin fastening grooves 53b are formed on the main wall of the shroud liner 52 to correspond to the support pin through holes 53a. The shroud body 51 and the shroud liner 52 are assembled to each other, by fastening tightening support pins 53c passing through the support pin through holes 53a to the support pin fastening grooves 53b and using an adhesive.

A plurality of bosses 54 are formed on the outer circumference of the shroud body 51. In the drawings, four bosses 54 are formed to support four jet vane assemblies 60. If three jet vane assemblies 60 are used, three bosses 54 are formed.

The front section of the shroud liner 52 is closely adhered to the rear section of the cylindrical unit 22 of the nozzle assembly 20, and the inner circumference of the front end of the shroud liner 52 is closely adhered to the outer circumference of the rear end of the exit liner 24a of the nozzle liner 24 of the nozzle assembly 20.

Each of the bosses 54 is formed in a rectangular shape having a circular bearing housing assembly space 54a. Bearing housing assembly holes 52a and 52b engaged with the bearing housing assembly spaces 54a of the bosses 54 are formed on the shroud liner 52, respectively.

The bearing housing assembly hole 52a of the shroud liner 52 has the same inside diameter as that of the bearing housing assembly space 54a of the boss 54, and the bearing housing assembly hole 52b has a larger diameter than the bearing housing assembly space 54a and the bearing housing assembly hole 52a. Therefore, a hooking jaw 52c is formed between the bearing housing assembly holes 52a and 52b.

A screw fastening hole 55 for fixing the shroud assembly 50 to the skin 30, and a screw through hole 56 for fixing a bearing housing 71 discussed later to the inside of the boss 54 are formed on the front surface of the boss 54.

As described above, the fixing screws 43a passing through the actuator body 41 and the screw through holes 35 of the mounting strip 34 are fastened to the screw fastening holes 55 for fixing the shroud assembly 50 to the skin 30.

The outer circumference of the shroud liner 52 is formed in a conical shape to correspond to the inner circumference of the shroud body 51. A plane unit 57 being parallel to the center axis of the skin body 31 and contacting the circumference on the basis of the center axis is formed in the position of the inner circumference of the shroud liner 52 corresponding to the boss 54.

Guide pins 58 are fastened to and protruded from the front surfaces of the bosses 54, and guide pin holes 38 are formed on the mounting strip 34, thereby precisely assembling the shroud assembly 40 and the jet vane assemblies 60 in regard to the skin 30.

The jet vane assembly 60 includes a plurality of jet vane shafts 61 rotationally supported by each boss 54, and a plurality of rectangular jet vanes 64 assembled to the inside ends of the jet vane shafts 61.

The jet vane shaft 61 includes a support unit 61a supported by the boss 54, a jet vane assembly unit 61b incorporated with the end of the inner circumference of the support unit 61a, the jet vane 64 being assembled to the jet vane assembly unit 61b, and an engaged unit 61c incorporated with the outside end of the support unit 61a and engaged with the crank assembly 80 discussed later.

The jet vane assembly unit 61b is extended from the end of the inner circumference of the support unit 61a to both sides to make a right angle with the axial line of the jet vane shaft 61. A vane shaft through hole 62 is extended from the center of the inside surface of the jet vane assembly unit 61b on the same axis as the jet vane shaft 61, and fastened to the vane shaft fastening groove 64a of the jet vane 64.

A pair of screw through holes 63 are formed on both sides of the jet vane assembly unit 61b.

The jet vane 64 is formed in a rectangular shape having inner and outer circumferences parallel to the center axis of the skin body 31 and having a streamlined section. A vane shaft fastening groove 64a to which the vane shaft through hole 62 is fastened, and a pair of screw fastening grooves 64b to which screws 65 passing through the pair of screw through holes 63 are fastened are formed on the jet vane 64.

The jet vanes 64 must be made of a material having a high melting point and a high heat conduction coefficient that can maintain strength and rigidity at a high temperature to endure an ablation environment by high temperature high speed combustion gas. Also they have good mechanical properties at ultra-high temperature to support the loads by dynamic pressure.

Accordingly, the jet vanes 64 are made of a copper infiltrated tungsten (CIT) alloy, and preferably high temperature ceramic coated with $ZrO_2$ according to a plasma spray treatment after a final process. Here, the jet vanes 64 are coated with $ZrO_2$ to prevent thermal impacts by the combustion gas at an initial stage of operation by minimizing heat transfer.

A heat shield plate 66 is inserted between the jet vane assembly unit 61b and the jet vane 64 to minimize heat transfer through the jet vane shaft 61 and improve the fluid dynamics performance of the jet vane 64. Preferably, the heat shield plate 66 is made of a molybdenum alloy steel, titanium zirconium molybdenum (TZM).

Preferably, the heat shield plate 66 is high temperature ceramic coated with $ZrO_2$ in the same manner as the jet vane 64.

Screw through holes 66b corresponding to a pair of screw through holes 63a are formed on both sides of the heat shield plate 66.

The screws 65 have excellent thermal-mechanical properties at a high temperature. Preferably, the screws 65 are made of a tantalum (Ta) material resistant to thermal impacts.

In order to prevent damages of the screws 65 by flame combustion gas and improve rigidity of the jet vane shafts 61, an assembly groove 66a having the same streamlined section as the section of the jet vane 64 is formed on the assembly part of the inside surface of the heat shield plate 66 with the jet vane 64, and the root periphery of the jet vane 64 is inserted into the assembly groove 66a.

Preferably, each jet vane shaft 61 is designed to its respective jet vane 64 at the center of pressure of the jet vane 64 during the operation.

The jet vane support unit 70 includes a cylindrical bearing housing 71 inserted into the bosses 54 of the shroud assembly 50, and a bearing 76 inserted between the jet vane shaft 61 and the bearing housing 71.

Screw fastening grooves 71a to which fixing screws 72 passing through the screw through holes 56 formed on the bosses 54 are fastened are formed on the bearing housing 71. In the drawings, four screw fastening grooves 71a are formed and four fixing screws 72 are used.

An O-ring 73a for maintaining airtightness is inserted between the inner circumferences of the bosses 54 and the outer circumference of the bearing housing 71. An O-ring 73b for maintaining airtightness is inserted between the outer circumference of the jet vane shaft 61 and the inner circumference of the bearing housing 71.

The bearing housing 71 is assembled to the shroud assembly 50 through a ring-shaped tightening strip 74 inserted between the inside surface of the bearing housing 71 and the outside surface of the jet vane assembly unit 61b.

Figure 14:
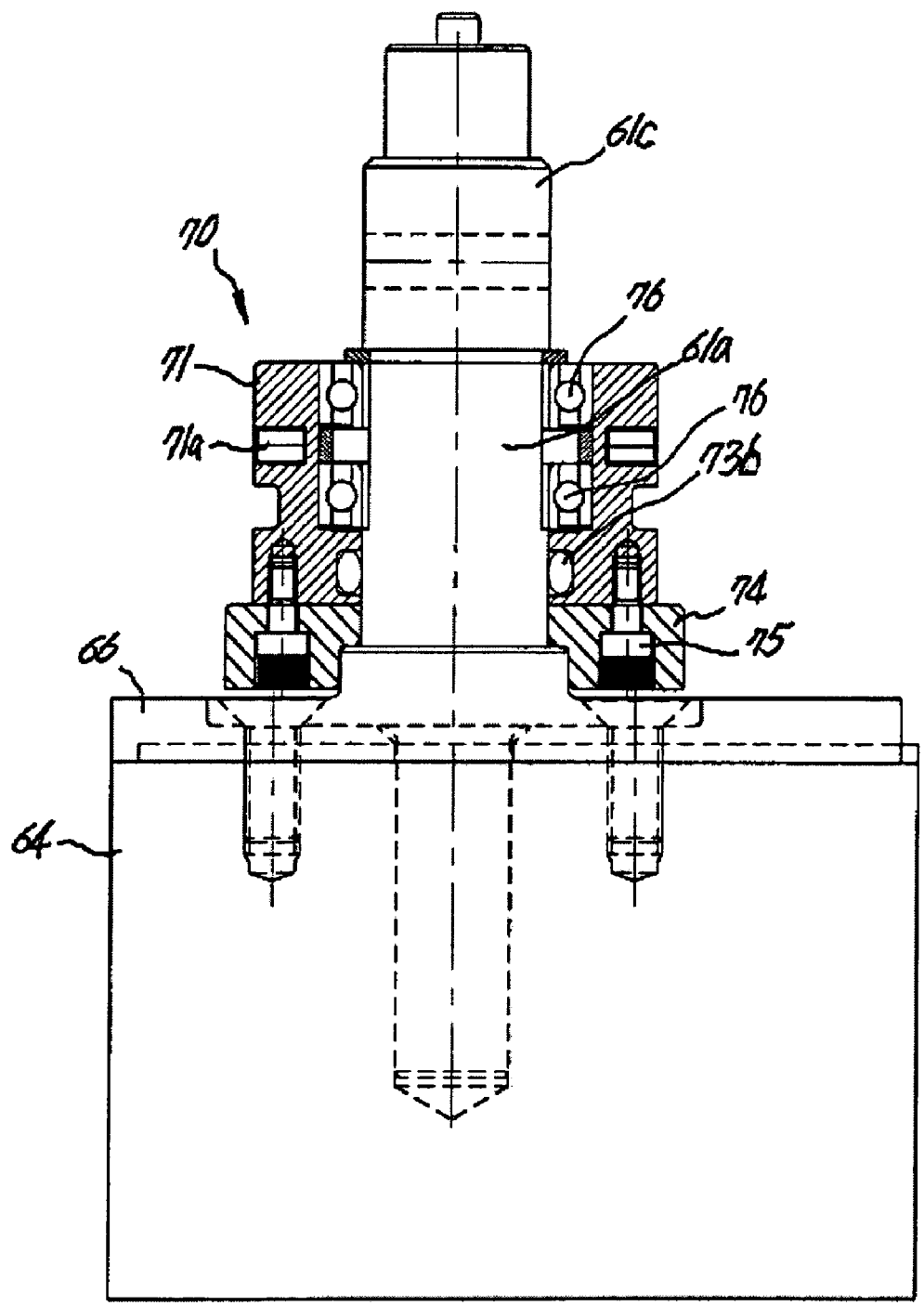
FIG. 14 is a vertical side view illustrating a assembly state of the jet vane assembly, a main bearing and a bearing housing.
Figure 15:
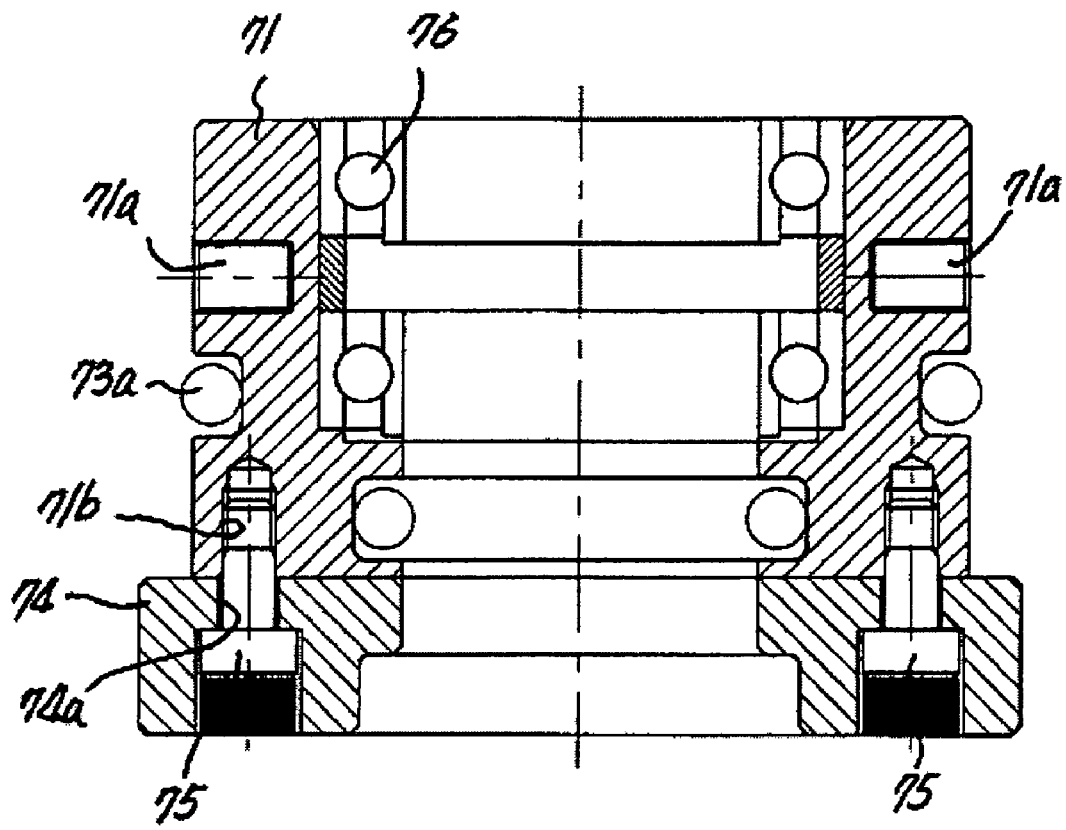
FIG. 15 is a vertical side view illustrating a assembly state of the main bearing and the bearing housing.

As illustrated in FIGS. 1, 14 and 15, the ring-shaped tightening strip 74 has an outside diameter larger than the bearing housing assembly hole 52a of the shroud body 51 and the bearing housing assembly hole 52a of the shroud liner 52, and sufficiently small to be inserted into the bearing housing assembly hole 52b of the shroud liner 52. Here, when the ring-shaped tightening strip 74 is inserted into the bearing housing assembly hole 52b, the edges of the outer circumference of the ring-shaped tightening strip 74 are hooked on the hooking jaw 52c.

Screw through holes 74a are formed on the ring-shaped tightening strip 74. The ring shaped tightening strip 74 and the bearing housing 71 are tightly assembled to each other, by fastening tightening screws 75 passing through the screw through holes 74a into the screw fastening grooves 71b formed on the inside surface of the bearing housing 71.

In order to more stably support the jet vane shaft 61, the outside end of the engaged unit 61c of the jet vane shaft 61 is supported by the jet vane shaft support plate 77 assembled to the mounting strip 34 of the skin 30.

The jet vane shaft support plate 77 is assembled to the skin 30 by fastening the screws 43b passing through the actuator body 41 and the screw through holes 35 of the mounting strip 34 to screw fastening grooves 77a formed at the front end of the jet vane shaft support plate 77.

An axial hole 77b into which the jet vane shaft 61 is inserted is formed on the jet vane shaft support plate 77, and a bearing 78 is inserted between the axial hole 77b and the jet vane shaft 61.

The crank assembly 80 includes a crank arm 81 having its one end fixed to the engaged unit 61c of the jet vane shaft 61, and a connection pin 84 for relatively rotationally connecting the other end of the crank arm 81 to the front end of the piston rod 42 of the actuator assembly 40.

The jet vane shaft 61 and the crank arm 81 are assembled to be rotated together, by inserting the engaged unit 61c into an axis coupling hole 81b of a connection ring unit 81a formed at one end of the crank arm 81, and passing a assembly pin 82 through the connection ring unit 81a and the engaged unit 61c.

A stop ring 83 is inserted onto one side of the assembly pin 82, for preventing separation of the assembly pin 82.

The connection pin 84 is inserted into the ring-shaped connection unit 42a formed at the front end of the piston rod 42 and the other end of the crank arm 81, so that the other end of the crank arm 81 and the front end of the piston rod 42 can be connected to be relatively rotated.

Reference numeral 79 denotes a position sensor installation unit formed at the rear end of the jet vane shaft support plate 77, for installing a potentiometer (not shown).

The assembly process of the JV-TVC system in accordance with the present invention will now be described.

1. In a state where the front end of the shroud liner 52 is positioned to correspond to the hooking jaw 51a of the shroud body 51 of the shroud assembly 50, the tightening support pins 53c passing through the pin through holes 53a of the shroud body 51 are assembled to the pin fastening grooves 53b of the shroud liner 52, thereby forming the shroud assembly 50.

2. When the jet vane 64 is inserted into the assembly groove 66a of the heat shield plate 66, the vane shaft through hole 62 of the jet vane shaft 61 is fastened to the vane shaft fastening groove 64a of the jet vane 64, and the screws 65 are fastened to the screw fastening grooves 64b of the jet vane 64 through the screw through holes 63a and 66b formed on the jet vane assembly unit 61b and the heat shield plate 66, thereby assembling the jet vane assembly 60 in which the jet vane shaft 61, the jet vane 64 and the heat shield plate 66 are assembled.

3. When the bearing housing 71 into which the bearing 76 is inserted is inserted into the bearing housing assembly space 54a of the boss 54, the ring-shaped tightening strip 74 is inserted into the bearing housing assembly holes 52a and 52b of the shroud liner 52, and the tightening screws 75 are fastened to the screw fastening grooves 71b of the bearing housing 71 through the screw through holes 74a of the ring-shaped tightening strip 74, the ring-shaped tightening strip 74 is hooked on the hooking jaw 52c between the bearing housing assembly holes 52a and 52b. Therefore, the shroud assembly 50 and the bearing housing 71 are firmly assembled to each other.

The bearing housing 71 is fixedly assembled to the bosses 54, by fastening the fixing screws 72 passing through the screw through holes 56 of the bosses 54 to the screw fastening grooves 71a of the bearing housing 71.

4. The support unit 61a of the jet vane shaft 61 to which the jet vane 62 is assembled is inserted into the bearing 76 of the bearing housing 71 assembled to the shroud assembly 50.

Here, the outer circumference of the jet vane 62 and the plane unit 57 of the shroud liner 52 has a small clearance.

5. The engaged unit 61c of the jet vane shaft 61 is inserted into the shaft assembly hole 81b of the crank arm 81 of the crank assembly 80, the assembly pin 82 is inserted to pass through the shaft assembly hole 81b and the engaged unit 61c, and the stop ring 83 is inserted thereto.

6. The jet vane shaft 61 is rotatably supported by the jet vane shaft support plate 77 by positioning the bearing 78, by inserting the end of the engaged unit 61c of the jet vane shaft 61 into the bearing 78 inserted into the axial hole 77b of the jet vane shaft support plate 77.

7. The screw fastening grooves 77a of the jet vane shaft support plate 77 are positioned to correspond to the screw through holes 35 of the mounting strip 34 and the screw fastening holes 55 of the boss 54 are positioned to correspond to the screw through holes 36 of the mounting strip 34, by inserting the guide pins 58 protruded from the boss 54 of the shroud assembly 50 into the guide pin holes 38 formed on the mounting strip 34 of the skin 30. The jet vane shaft support plate 77 is assembled to the mounting strip 34 of the skin 30 by fastening the fixing screws 43b passing through the screw through holes 35 to the screw fastening grooves 77a, and the shroud assembly 50 is assembled to the mounting strip 34 of the skin 30 by fastening the fixing screws 43 passing through the screw through holes 36 to the screw fastening grooves 55 of the boss 54.

Here, the fixing screws 43a and 43b can be fastened to the screw fastening grooves 77a and 55 through the screw through holes 35 and 36 after passing through the actuator body 41 disposed at the front side of the mounting strip 34, for assembling the actuator assembly 40 at the same time.

8. The ring-shaped connection unit 42a formed at the front end of the piston rod 42 is positioned to correspond to the connection ring unit 81a of the crank arm 81, and the connection pin 84 is inserted thereto, thereby relatively rotatably connecting the crank arm 81 and the piston rod 42.

Therefore, the assembly process of the JV-TVC system module M is finished.

9. As described above, in order to assemble the JV-TVC system module M and the rocket motor 10, the front end of the skin 30 is inserted into the outer circumference of the case flange unit 12 of the rocket motor 10 and the flange unit 23 of the nozzle assembly 20, and the screws 33 passing through the screw through holes 32 of the skin body 31 are fastened to the bolt fastening grooves 12a of the case flange unit 12. Accordingly, the JV-TVC system module M is assembled to the rocket motor 10 and the nozzle assembly 20.

The inner circumference of the front end of the shroud body 51 of the shroud assembly 50 is closely adhered to the outer circumference of the cylindrical unit 22 of the nozzle assembly 20, and the front section of the shroud liner 52 is closely adhered to the rear section of the cylindrical unit 22 of the nozzle assembly 20.

In the assembly process, in a state where the jet vane support unit 70 is assembled to the shroud assembly 50 and the jet vane assemblies 60 are assembled to the jet vane support unit 70, in order to assemble the resulting structure and the skin 30, the guide pins 58 protruded from the bosses 54 of the shroud assembly 50 are inserted into the guide pin holes 38 formed on the mounting strip 34 of the skin 30, and the fixing screws 43a and 43b are fastened thereto. As a result, the shroud assembly 50 and the jet vane assemblies 60 are precisely assembled in regard to the skin 30.

To easily assemble the skin 30 assembled with the shroud assembly 50 and the jet vane assemblies 60 to the rocket motor 10, the plurality of screws 33 are fastened to the screw fastening grooves 14 of the case flange unit 12 of the rocket motor 10 through the screw through holes 32 formed on the skin body 31.

After the assembly process is finished, when the actuator assembly 40 is operated, the piston rod 42 is linearly moved in the forward/backward direction, the jet vane shafts 61 connected to the front end of the piston rod 42 through the crank arm 81 are rotated in the right/left direction, and the jet vanes 64 assembled to the jet vane shafts 61 are rotated in the right/left direction, thereby controlling the thrust vector.

Since the root circumferences of the jet vanes 64 and the plane unit 57 of the shroud liner 52 of the shroud assembly 50 has a small clearance, the rotational angles of the jet vanes 64 are not restricted to operate thrust vector control and high angle of attack maneuvering performance of the missile.

In addition, the front section and the front inner circumference of the shroud liner 52 are assembled to the rear section and the rear outer circumference of the cylindrical unit 22, respectively, forming complicated paths. Therefore, when flame gas is ejected from the rocket motor 10, the flame gas and heat are rarely transmitted to the jet vane support unit 70 supporting the jet vane assemblies 60 and the crank assembly 80. As a result, the thrust vector of the missile can be precisely controlled by preventing damages of the components for the designated flight time of the missile.

As discussed earlier, in accordance with the present invention, the JV-TVC system improves thrust vector control and high maneuvering performance of the missile by allowing the rotational angles of the jet vanes to maximum ±30°, precisely controls the thrust vector of the missile by preventing damages of the components for the designated flight time of the missile, and improves precision and reliability in the assembly process by modularization.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A jet vane thrust vector control system, comprising:
a rocket motor having a motor case, and a case flange unit protruded from the rear end of the motor case in a ring shape;
a nozzle assembly including a nozzle body having a flange unit assembled to the case flange unit and a cylindrical unit extended from the flange unit in the backward direction, and a nozzle liner assembled to the inner circumferences of the cylindrical unit and the flange unit and extended longer than the cylindrical unit in the backward direction;
a skin including a skin body having its front end inner circumference closely adhered to the outer circumference of the case flange unit, and being fixed by fastening a screw passing through a main wall to the case flange unit, and a mounting strip formed on the inner circumference of the skin body as a ring-shaped plate;
an actuator assembly including an actuator body fixed to the front surface of the mounting strip of the skin, and a piston rod protruded from the actuator body in the backward direction and linearly reciprocated in the forward/backward direction;
a shroud assembly including a cylindrical shroud body disposed at the rear end of the cylindrical body of the nozzle body, a shroud liner assembled to the inner circumference of the shroud body, and a plurality of bosses protruded from the outer circumference of the shroud body;
a jet vane assembly including a jet vane shaft rotationally supported by the bosses, and a jet vane assembled to the inside end of the jet vane shaft;
a jet vane support unit including a bearing housing inserted into the boss unit, a bearing inserted into the bearing housing, for supporting the jet vane shaft, and a jet vane shaft mounting strip for supporting the outside end of the jet vane shaft; and
a crank assembly engaged with the piston rod of the actuator assembly, for rotating the jet vane shaft and the jet vane in the right/left direction.

2. The system of claim 1, wherein the inner circumference of the front end of the shroud body is closely adhered to the outer circumference of the cylindrical unit of the nozzle assembly and hermetically sealed by an O-ring, and the front section of the front end of the shroud liner maintains a predetermined interval from the cylindrical unit and the inner circumference thereof maintains a predetermined interval from the outer circumference of the rear end of the nozzle liner, for forming complicated paths for preventing inflow of flame gas.

3. The system of claim 2, wherein a hooking jaw on which the outer circumference of the front end of the shroud liner is hooked is formed at the front end of the shroud body.

4. The system of claim 1, wherein the bosses of the shroud body and the jet vane shaft mounting strip are fixed to the mounting strip of the skin by fixing screws passing through the actuator body and the mounting strip.

5. The system of claim 1, wherein the jet vane is formed in a rectangular shape having inner and outer circumferences parallel to the center axis of the skin body and having a streamlined section, and a plane unit being parallel to the Center axis of the skin body to correspond to the outer circumference of the jet vane and contacting the circumference on the basis of the center axis is formed in the position of the inner circumference of the shroud liner corresponding to the bosses.

6. The system of claim 5, wherein the jet vane shaft comprises a support unit supported by the bosses, a jet vane assembly unit incorporated with the inside end of the support unit, the jet vane being assembled to the jet vane assembly unit, and an engaged unit incorporated with the outside end of the support unit and engaged with the crank assembly.

7. The system of claim 6, wherein a vane shaft fastening groove is formed on the root periphery of the jet vane, the jet vane assembly unit is extended from the end of the inner circumference of the support unit to both sides to make a right angle with the axial line of the jet vane shaft, and a vane shaft through hole is extended from the center of the inside surface thereof on the same axis as the jet vane shaft, and fastened to the vane shaft fastening groove of the jet vane.

8. The system of any one of claims 5 to 7, wherein a heat shield plate is inserted between the jet vane assembly unit and the jet vane.

9. The system of claim 8, wherein a assembly groove into which the root periphery of the jet vane is inserted is formed on the assembly part of the inside surface of the heat shield plate with the jet vane to have the same streamlined section as the section of the jet vane.

10. The system of either claim 1 or 6, wherein the crank assembly comprises a crank arm having its one end fixed to the engaged unit of the jet vane shaft, and a connection pin for relatively rotatably connecting the other end of the crank arm to the front end of the piston rod of the actuator.

* * * * *